UNITED STATES PATENT OFFICE.

MARTIN MOEST, OF HÖCHST-ON-THE-MAIN, AND ERIK SCHIRM, OF UNTERLIEDERBACH, NEAR HÖCHST-ON-THE-MAIN, GERMANY, ASSIGNORS, BY MESNE ASSIGNMENTS, TO THE CHEMICAL FOUNDATION, INC., A CORPORATION OF DELAWARE.

MANUFACTURE OF ORGANIC ACIDS AND ACID ANHYDRIDS.

1,337,253.      Specification of Letters Patent.      Patented Apr. 20, 1920.

No Drawing. Application filed May 27, 1916, Serial No. 100,349. Renewed June 26, 1919. Serial No. 306,840½.

*To all whom it may concern:*

Be it known that we, MARTIN MOEST, Ph. D., chemist, and ERIK SCHIRM, Ph. D., chemist, citizens of the Empire of Germany, residing at Höchst-on-the-Main, Germany, and Unterliederbach, near Höchst-on-the-Main, respectively, have invented certain new and useful Improvements in the Manufacture of Organic Acids and Acid Anhydrids, of which the following is a specification.

We have found that nitric peroxid (nitrogen tetroxid) — $NO_2, N_2O_4$ — or mixtures thereof or its compounds with nitrogen monoxid (nitric oxid) — $NO$ — enters into reaction with anhydrous salts of suitable organic acids even at ordinary or moderately raised temperature so as to form the corresponding acid anhydrids. The salts thus pass into nitrates while free nitric oxid is evolved. When using sodium acetate and pure nitric peroxid the reaction occurs according to the following equation:—

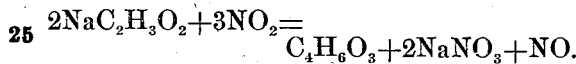

$$2NaC_2H_3O_2 + 3NO_2 = C_4H_6O_3 + 2NaNO_3 + NO.$$

The nitric oxids may be used either in a pure state (in a gaseous, liquid or solid condition) or dissolved in any indifferent solvent and also the salts of the organic acids may be employed either in a pure state *i. e.* in the form of a powder or of small lumps, or with an addition of a suitable solvent or distributing agent. In order to obtain a good yield, it is advantageous not to use an excess of the nitric oxids, because otherwise they will enter into reaction with the acid anhydrids. The presence of an indifferent gas does not interfere with the reaction. The nitric oxid gas liberated during the reaction can be easily re-transformed into the higher nitric oxids and used for a further reaction.

When water is present, there are formed, according to its quantity, either mixtures of the acids with their anhydrids or only acids; however the formation of the latter may, if required, be almost entirely prevented. (See Example I, hereafter).

The following examples illustrate our invention, the parts being by weight:

Example I: 4 parts of pure nitric peroxid are introduced while cooling in a reflux-apparatus into 5 parts of dry finely-powdered sodium acetate; the mass is then gently heated for several hours in a reflux cooling-apparatus which causes an evolution of nitric oxid whereupon the resulting mass is left at rest for a considerable time at ordinary temperature and finally distilled in a vacuum. The colorless distillate thus obtained consists of acetic anhydrid besides small quantities of acetic acid. It may, for instance, contain 85 per cent. of anhydrid and 15 per cent. of acid. This mixture can be easily separated by fractionation. The yield is almost quantitative.

Example II: 5 parts of dry sodium acetate finely subdivided and 4 parts of pure, liquid nitrogen tetroxid are introduced by drops into 15 parts of dry carbon tetrachlorid and this mixture is further treated as indicated in Example I. After the reaction is complete, the carbon tetrachlorid is distilled off under ordinary pressure and the volatile products of the reaction are distilled off in a vacuum, the yield being almost quantitative. For the carbon tetrachlorid may be substituted glacial acetic acid or acetic anhydrid, which is advantageous in so far as in that case the volatile products of the reaction will not contain any admixture of foreign bodies.

Having now described our invention, what we claim is:—

1. The process of preparing organic acids and acid anhydrids, which consists in causing nitrogen-oxygen compounds containing less oxygen than the nitric anhydrid ($N_2O_5$), but more oxygen than the nitrogen monoxid ($NO$), to act upon the salts of organic acids.

2. The process of preparing organic acids and acid anhydrids, which consists in causing nitric peroxid (nitrogen tetroxid) to act upon the salts of organic acids.

3. The process of preparing organic acids and acid anhydrids, which consists in causing a mixture of nitric peroxid and nitrogen monoxid (nitric oxid) to act upon the salts of organic acids.

4. The process of preparing organic acids and acid anhydrids, which consists in causing a compound of nitric peroxid with nitrogen monoxid to act upon the salts of organic acids.

5. The process of preparing organic acids and acid anhydrids, which consists in causing nitrogen-oxygen compounds containing less oxygen than the nitric anhydrid ($N_2O_5$) but more oxygen than the nitrogen monoxid (NO), to act upon the salts of organic acids in presence of a suitable solvent and distributing agent.

6. The process of preparing organic acids and acid anhydrids, which consists in causing nitrogen-oxygen compounds containing less oxygen than the nitric anhydrid ($N_2O_5$) but more oxygen than the nitrogen monoxid (NO), to act upon the salts of organic acids and using as solvent and distributing agent a mass containing the same acids as are produced by the reaction.

7. The process of preparing organic acids and acid anhydrids, which consists in causing nitrogen-oxygen compounds containing less oxygen than the nitric anhydrid ($N_2O_5$) but more oxygen than the nitrogen monoxid (NO), to act upon the salts of organic acids, and using as solvent and distributing agent a mass containing the same acid anhydrids as are produced by the reaction.

8. The process of preparing organic acids and acid anhydrids, which consists in causing nitrogen-oxygen compounds containing less oxygen than the nitric anhydrid ($N_2O_5$), but more oxygen than the nitrogen monoxid (NO), to act upon the salts of organic acids, and using as solvent and distributing agent an indifferent solvent.

In testimony whereof we affix our signatures in presence of two witnesses.

MARTIN MOEST.
ERIK SCHIRM.

Witnesses:
  JEAN GRUND,
  CARL GRUND.